United States Patent [19]

Suzuki

[11] Patent Number: 5,065,095
[45] Date of Patent: Nov. 12, 1991

[54] POSITION DETECTING APPARATUS HAVING MEANS FOR DETECTING DC COMPONENTS OF AC DETECTION SIGNALS

[75] Inventor: Masumi Suzuki, Aichi, Japan

[73] Assignee: Kabushiki Kaisha Okuma Tekkosho, Aichi, Japan

[21] Appl. No.: 552,930

[22] Filed: Jul. 13, 1990

[30] Foreign Application Priority Data

Jul. 21, 1989 [JP] Japan ................................. 1-189901

[51] Int. Cl.$^5$ .......................... G01B 7/14; G01B 7/30
[52] U.S. Cl. ................................. 324/207.25; 324/225
[58] Field of Search ..................... 324/207.24, 207.25, 324/207.26, 207.23, 207.13, 207.14, 207.12, 225-227, 233

[56] References Cited

U.S. PATENT DOCUMENTS

| | | | |
|---|---|---|---|
| 4,464,935 | 8/1984 | McHugh | 324/207.24 X |
| 4,518,917 | 5/1985 | Oates et al. | 324/207.25 |
| 4,644,270 | 2/1987 | Oates et al. | 324/207.25 |
| 4,761,609 | 8/1988 | Dorman et al. | 324/207.25 X |
| 4,785,242 | 11/1988 | Vaidya et al. | 324/207.25 |
| 4,855,734 | 8/1989 | Elsdoerfer | 324/207.25 X |
| 4,858,158 | 8/1989 | Ishikawa | 324/207.25 X |
| 4,876,505 | 10/1989 | Osborne | 324/207.25 |

Primary Examiner—Kenneth A. Wieder
Assistant Examiner—W. S. Edmonds
Attorney, Agent, or Firm—Wenderoth, Lind & Ponack

[57] ABSTRACT

A position detecting apparatus detects the position of an object and includes a sensor device which outputs first and second AC detection signals which have a predetermined phase relationship and which correspond to a detected position of the object. An instantaneous value detecting unit detects and outputs instantaneous values of the first and second AC detection signals. A DC component detecting unit processes the instantaneous values to obtain first and second DC components of the first and second AC detection signals, respectively. A position calculating section calculates the position of the object based on a difference between the first DC component and the first AC detection signal, and a difference between the second DC component and the second AC detection signal.

9 Claims, 6 Drawing Sheets

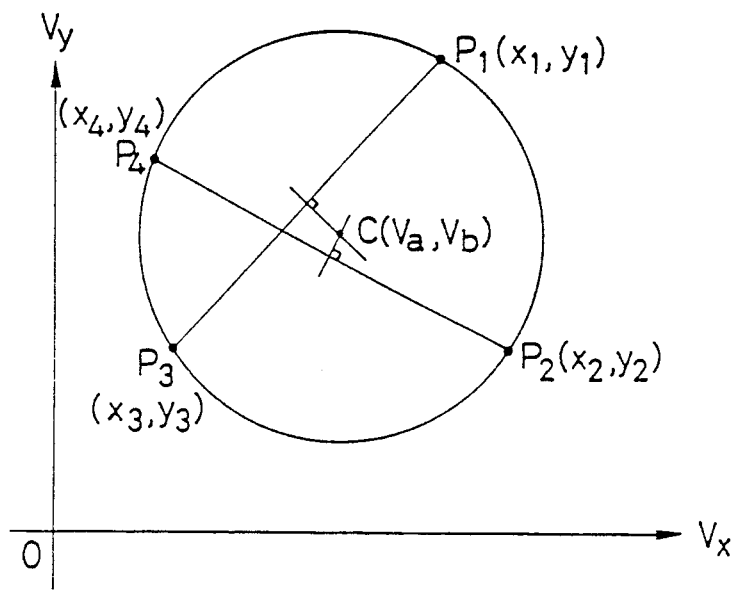
F I G. 7
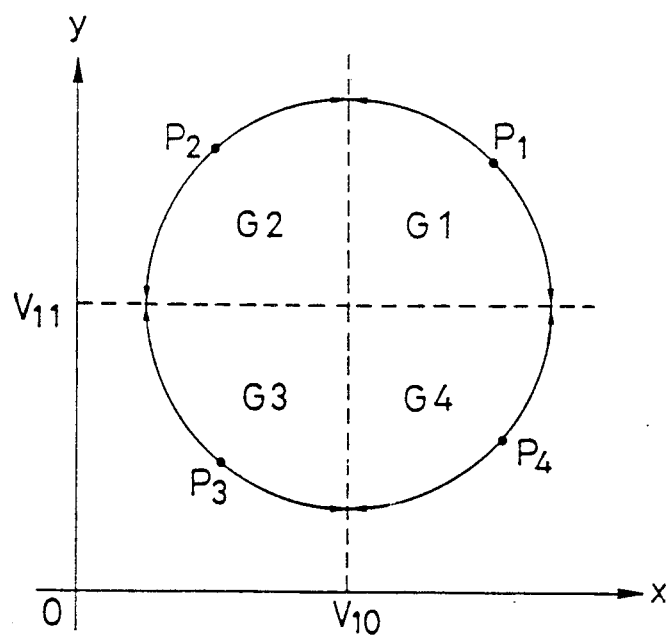
F I G. 8

POSITION DETECTING APPARATUS HAVING MEANS FOR DETECTING DC COMPONENTS OF AC DETECTION SIGNALS

BACKGROUND OF THE INVENTION

1. Field of the Invention

This invention relates to a position detecting apparatus which includes a sensor unit having a two-phase output, an instantaneous value detecting unit associated with the sensor output, a direct-current (DC) component detecting unit associated with the instantaneous value detecting unit, and a position detecting unit which subtracts a detected DC component from the sensor output to detect a position of an object.

2. Description of the Prior Art

FIG. 1 shows a prior art position detecting apparatus wherein a rotary member 1, which is the object of the detection, has attached a gear member 2 made of a permeable material, and wherein magnetic sensors 3, 4 and a magnet 5 are arranged to oppose the gear 2. The outputs $V_x$ and $V_y$ from the magnetic sensors 3 and 4 are respectively applied to the inputs of sample and hold circuits (S/H) 11 and 12 of an instantaneous value detecting unit 10, as well as to the inputs of comparator circuits 21 and 22 of a position high-order digit detecting circuit 20. The outputs of the sample and hold circuits 11 and 12 are respectively applied to the inputs of A/D converters 13 and 14, and thus digitized instantaneous values $S_x$ and $S_y$ are respectively applied to the inputs of subtracters 31 and 32 of a position detecting unit 30. The outputs from the comparator circuits 21 and 22 are applied to the inputs of a pulse counter 23 where the comparator outputs are counted. The high-order digit data TN at the positions counted are applied to the input of an adder 35 of the position detecting unit 30. The inputs of subtracters 31 and 32 are applied with direct-current component data $V_a$ and $V_b$ which have been measured and stored respectively, the remainders $V_1 = V\cos\Theta$ and $V_2 = V\sin\Theta$ are applied to the input of a divider 33, and the thus obtained quotient $V_2/V_1$ is applied to the input of a $\tan^{-1}$ circuit 34.

FIG. 2 is an operational flow chart of the structure mentioned above. When the rotary member 1 rotates, the gear member 2 rotates, and the sensor unit made up of the gear member 2, the magnetic sensors 3, 4 and the magnet 5 generates two-phase alternating current signals $V_x$ and $V_y$:

$$V_x = V\cos\Theta + V_a$$
$$V_y = V\sin\Theta + v_b \quad (1)$$

When the instantaneous value unit 10 detects the digital instantaneous values $S_x$ and $S_y$ of the two-phase AC signals $V_x$ and $V_y$ (Step S10), the position high-order digit detecting circuit 20 calculates the high-order data TN of the position signals which correspond to the number of teeth of the gear 2 which have passed through the magnetic sensors 3, 4. When the gear member 2 rotates together with the rotary member 1, the magnetic flux transmitted through the magnetic sensors 3 and 4 differs depending on the position of the rotary member 1 because of the configuration of the outer periphery of the gear member 2, whereby the magnetic sensors 3 and 4 generate signals $V_x$ and $V_y$ of the above equation (1) corresponding to the position of the object. The phase of the AC component included in the output signals $V_x$ and $V_y$ from the magnetic sensors 3 and 4 is set at 90° by making the interval between the magnetic sensors 3 and 4 correspond to one quarter of the gear pitch of the gear member 2. The position high-order digit detecting circuit 20 detects the number of gear teeth of the object which have passed through the magnetic sensors 3, 4, or the positional high-order digits, and the comparator circuits 21 and 22 convert the signals $V_x$ and $V_y$ output from the magnetic sensors 3 and 4 into pulses and the counter 23 counts the number of respective pulses. The instantaneous value detecting unit 10, including the sample and hold circuits 11, 12 and the A/D converters 13, 14, detects in digital values the instantaneous values of the two-phase AC signals $V_x$ and $V_y$ from the magnetic sensors 3 and 4. The subtracters 31 and 32 of the position detecting unit 30 subtract respectively the DC component data $V_a$ and $V_b$ which have been measured and stored in advance from the digital instantaneous values $S_x$ and $S_y$ output from the instantaneous value detecting unit 10 to obtain AC component signals $V\cos\Theta$ and $V\sin\Theta$, or to obtain the result of the subtraction of DC components $V_a$ and $V_b$ from the two-phase AC signals $V_x$ and $V_y$ (Step S11). The ratio between the AC component signals $V\cos\Theta$ and $V\sin\Theta$, or $\tan\Theta = V\sin\Theta/V\cos\Theta$, is obtained by the divider 33 and the position $\Theta$ of the gear member 2 is detected by executing the inverse trigonometric function conversion $\tan^{-1}$ using the $\tan^{-1}$ circuit 34 (Step S12).

$$\Theta = \tan^{-1}\{(S_y - V_b)/(S_x - V_a)\} \quad (2)$$
$$= \tan^{-1}(V\sin\Theta/V\cos\Theta)$$

By adding the value to the position high-order digit data TN from the detecting unit 20 at a downstream adder 35, an arbitrary position of the gear member 2 and hence, the rotary member 1, is detected as a positional signal PS (Step S13).

The aforementioned prior art position detecting apparatus uses values which have been measured and stored in advance as the DC component values $V_a$ and $V_b$ of equation (1).

However, in practice, the values of DC components $V_a$ and $V_b$ constantly change due to temperature changes, varying moving rates of the object, variations in the distance from the object to the sensor, or various other factors. The prior art position detecting apparatus is not sufficiently adaptive to those variations and therefore, the position PS detected in the Step S13 according to equation (2) is deviated from the actual position of the object.

SUMMARY OF THE INVENTION

This invention was conceived to obviate the aforementioned defects in the prior art and aims at providing a position detecting apparatus which can calculate the direct-current component values $V_a$ and $V_b$ directly from the signals output from the positional detecting sensor so as to be adaptive to changes in the DC component $V_a$ and $V_b$.

According to one aspect of this invention, for achieving the objects described above, there is provided a position detecting apparatus for detecting the position of an object by utilization of two-phase components which are contained within the signals output from a position detecting sensor and which have predetermined phases corresponding to the position of the object. The invention characterized in that the detecting apparatus includes a sensor unit which outputs signals containing the two-phases AC components, an instantaneous value detecting unit which detects instantaneous values of the signals output from the sensor unit, a DC component detecting unit which detects DC components contained in the output signals from the sensor unit by processing the instantaneous values based on a prescribed formula. and a position detecting unit which detects the position of the object based on a difference between the signals output from the DC component detecting unit and the signals output from the sensor unit.

The nature, principle and utility of the invention will become more apparent from the following detailed description when read in conjunction with the accompanying drawings.

BRIEF DESCRIPTION OF THE DRAWINGS

In the accompanying drawings:

FIGS. 6 and 7 are graphs showing the method of calculating the center of a circle traced in FIG. 5 as the DC components of the output signals; and FIG. 8 is a graph showing classification of the output signals by utilization of the path of FIG. 6.

DESCRIPTION OF THE PREFERRED EMBODIMENT

The apparatus of this invention includes a sensor unit having a two-phase output, in instantaneous value detecting unit associated with the sensor output, a DC component detecting unit associated with the sensor output and a position detecting unit which substracts a DC component from the sensor output. The output signals from the position detecting sensor are detected by the instantaneous value detecting unit as the instantaneous values $V_x$ and $V_y$ expressed in the equations:

$$V_x = V\cos\Theta + V_a$$

$$V_y = V\sin\Theta + V_b \quad (3)$$

The instantaneous values $V_x$ and $V_y$ are made up of the two-phase AC components $V\cos\Theta$ and $V\sin\Theta$ and DC components $V_a$ and $V_b$ corresponding to the position of an object. According to this invention, the DC components $V_a$ and $V_b$ are detected by the DC component detecting unit by utilization of at least three different instantaneous values of $V_x$ and $V_y$.

Figure 5A:
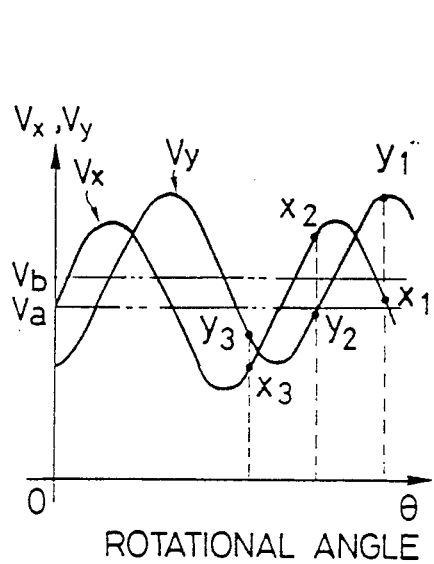
FIG. 5A and 5B are graphs of output signals from the position detecting/sensor.
Figure 5B:
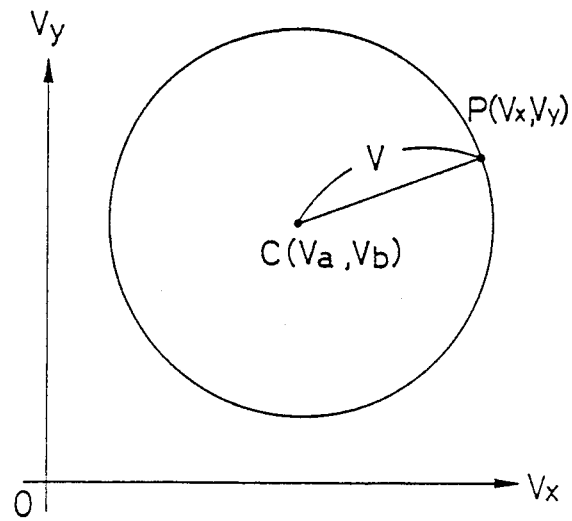

More specifically, as expressed by equation (3) and illustrated in FIG. 5A, if a point P ($V_x$, $V_y$) having respective instantaneous values $V_x$, $V_y$ as its components is assumed to be on a plane of $V_x - V_y$, the path of the point P traces a circle of a radius V having a center C ($V_a$, $V_b$). Therefore, if the components of three or more different points along the circumference of the circle shown in FIG. 5B are given, the compound ($V_a$, $V_b$) at the center C of the circle shown in FIG. 5B can be calculated using the values of the three or more points. In other words, the DC components $V_a$ and $V_b$ of the output signals from the position detecting sensor may be calculated. If calculations are conducted in accordance with the equations below based on the values of the DC components $V_a$, $V_b$ and the instantaneous values $V_x$ and $V_y$ of the position detecting sensor, the position $\Theta$ of the object can be detected.

$$V_1 = S_x - V_a = V\cos\Theta$$

$$V_2 = S_y - V_b = V\sin\Theta \quad (4)$$

$$\Theta = \tan^{-1}\frac{V_2}{V_1} = \tan^{-1}\frac{S_y - V_b}{S_x - V_a} \quad (5)$$

$$= \tan^{-1}\frac{V\sin\Theta}{V\cos\Theta}$$

Figure 1:
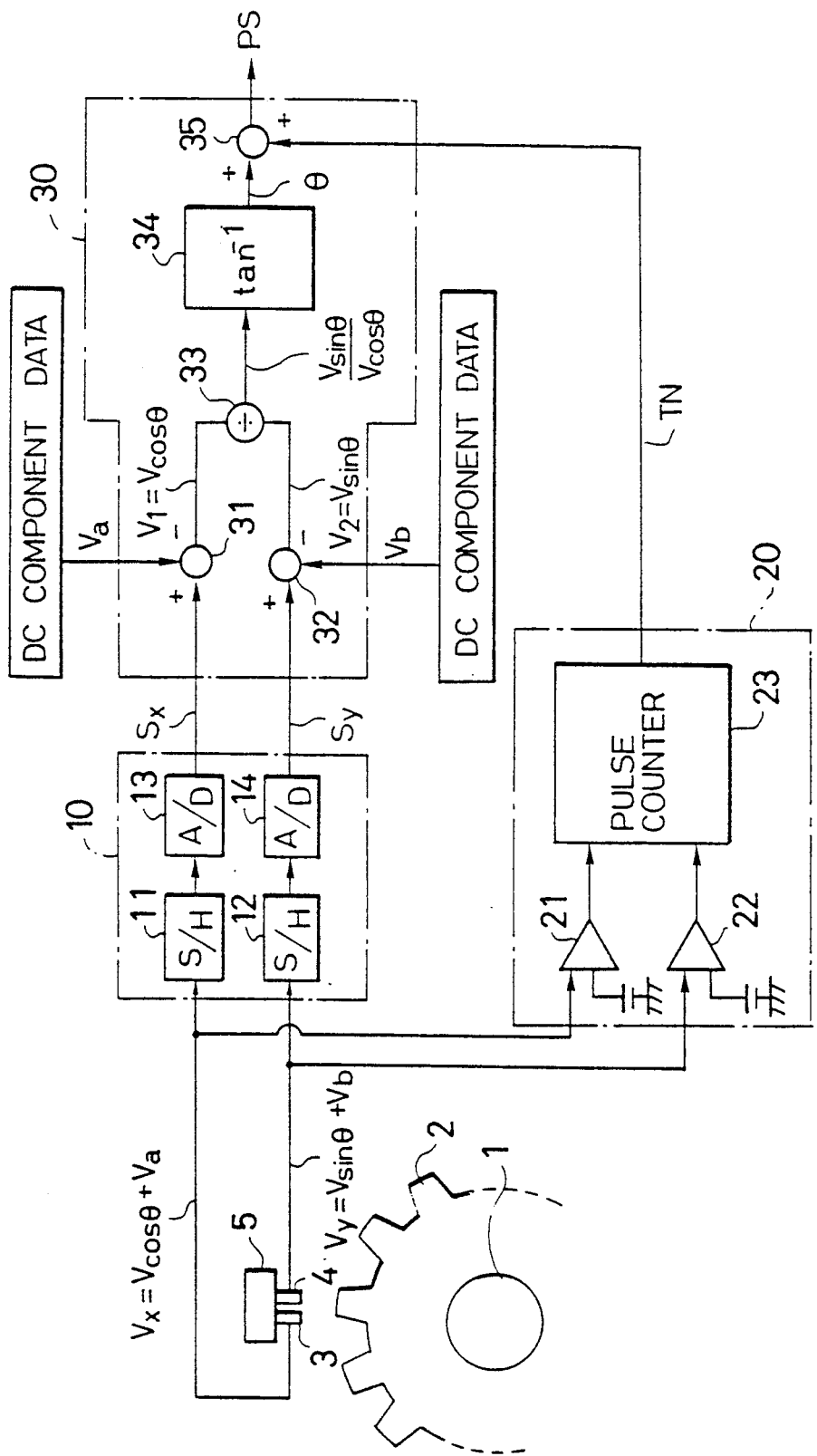
FIG. 1 is a block diagram showing a prior art position detecting apparatus.
Figure 2:
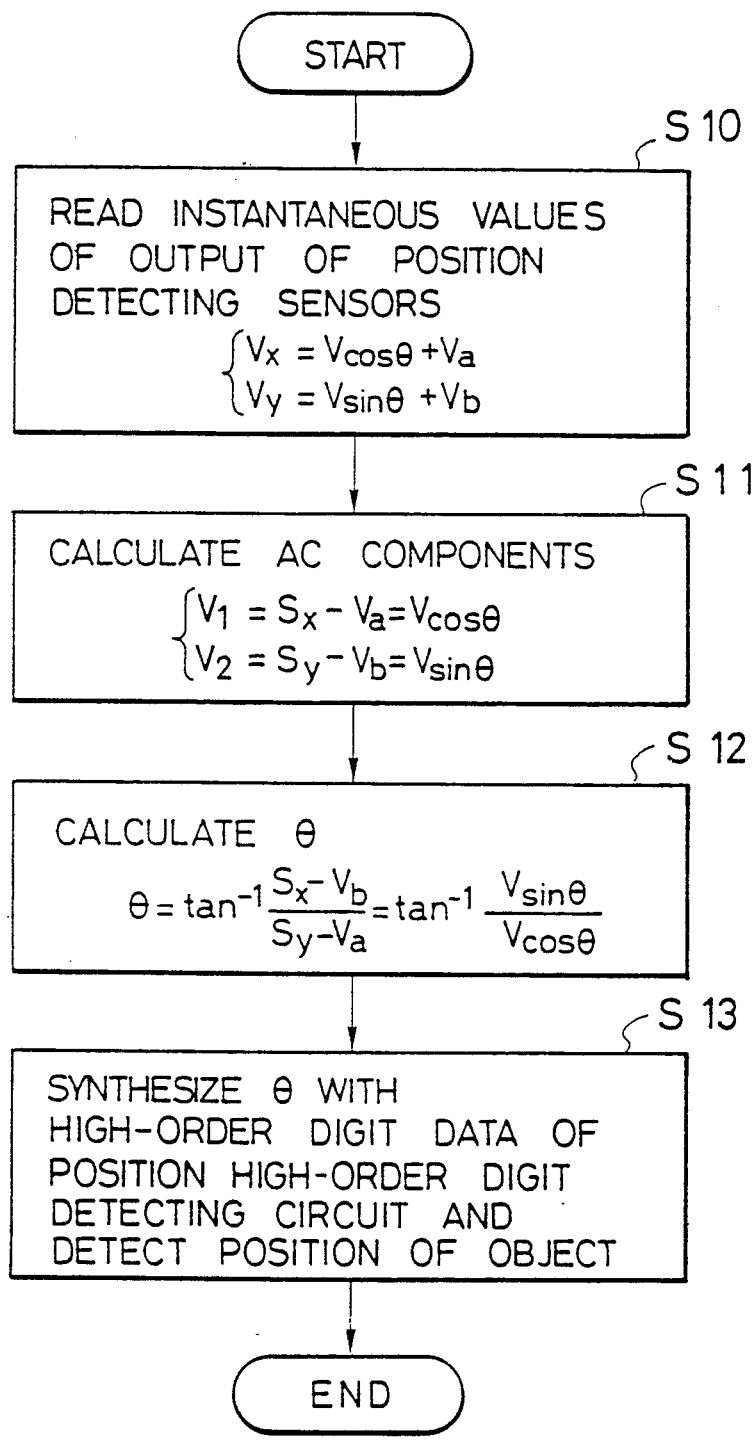
FIG. 2 is a flow chart showing an example of the operation thereof.
Figure 3:
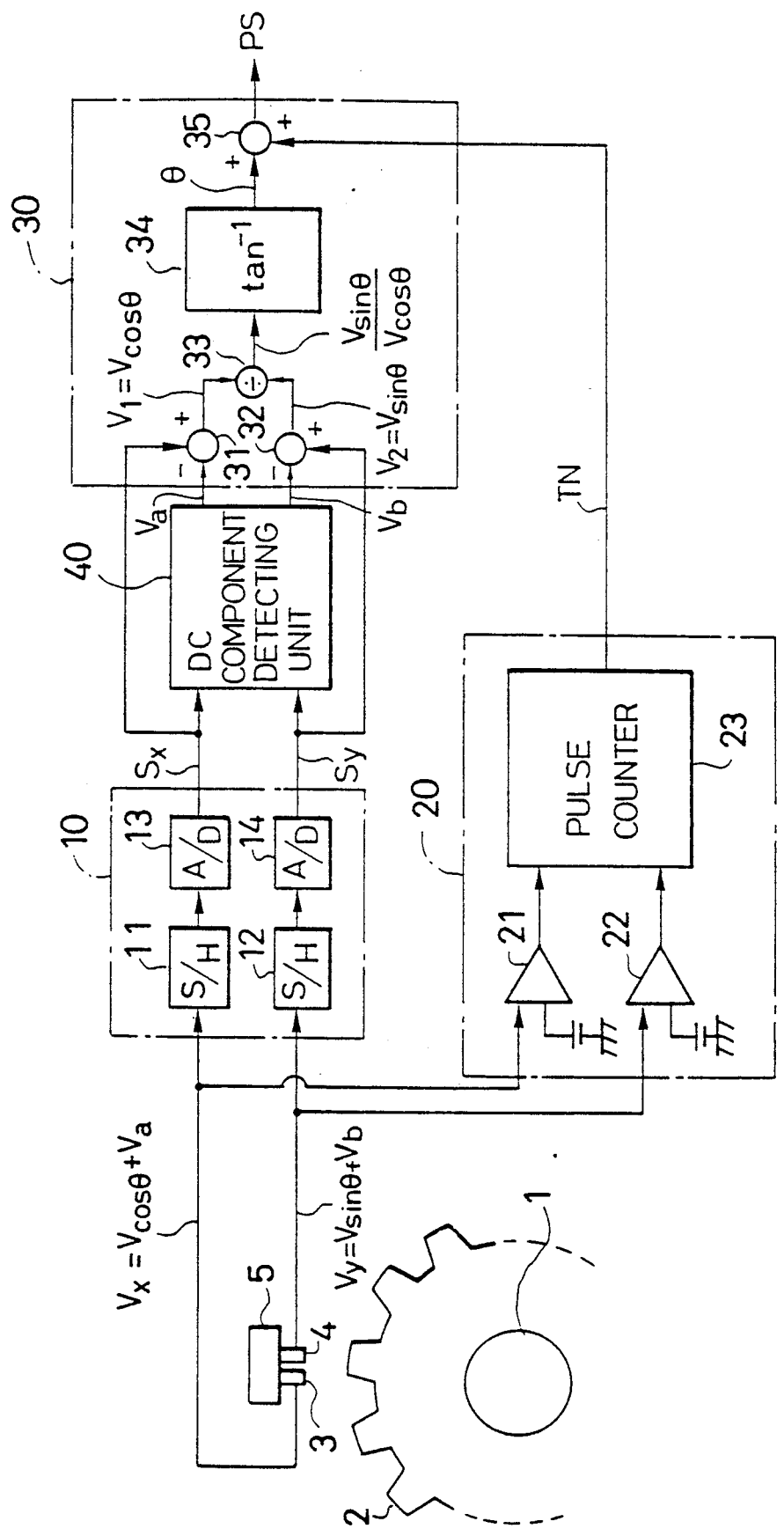
FIG. 3 is a block diagram showing an embodiment of this invention.
Figure 4:
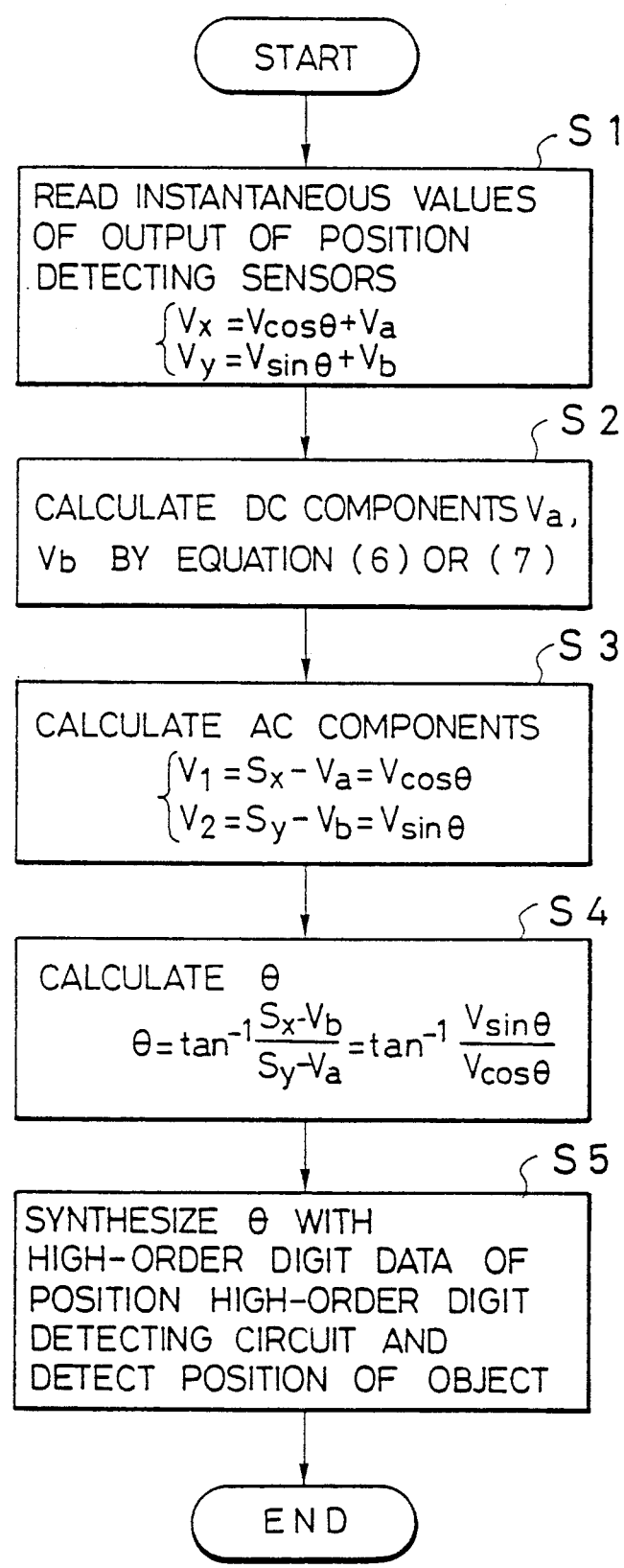
FIG. 4 is a flow chart showing an example of the operation thereof.

This invention will now be described in more detail referring to an embodiment shown in FIG. 3. FIG. 3 depicts the entire structure of an embodiment of this invention, and FIG. 4 is a flow chart showing the processing of a microcomputer in FIG. 3.

As shown in FIG. 3, the embodiment is provided with a DC component detecting unit 40 which has input thereto the digital instantaneous values $S_x$ and $S_y$ from the instantaneous value detecting unit 10 and which detects the DC components $V_a$ and $V_b$ by arithmetic operations. FIG. 4 indicates the processing steps of position detection of the microcomputer by utilization of DC component detection. The microcomputer reads the instantaneous values $V_x$ and $V_y$ of the signals output from the magnetic sensors 3 and 4 as shown in FIG. 5A (Step S1). The instantaneous values are the points on the circumference of a circle of radius V with the center at the point C ($V_a$, $V_b$) as expressed by the equation (3). Therefore, if three different points $P_1(x_1, y_1)$, $P_2(x_2, y_2)$ and $P_3(x_3, y_3)$ on the circumference are known, the components ($V_a$, $V_b$) of the center C of the circle will be calculated as the intersection of respective perpendicular bisectors of line segments $P_1P_3$ and $P_2P_3$ in accordance with the following equations.

$$V_a = \frac{1}{2}\left\{ \frac{(x_1^2 - x_3^2)(y_2 - y_3) - (x_2^2 - x_3^2)(y_1 - y_3)}{(x_1 - x_3)(y_2 - y_3) - (x_2 - x_3)(y_1 - y_3)} + \right. \quad (6)$$

$$\left. \frac{-(y_1 - y_2)(y_2 - y_3)(y_3 - y_1)}{(x_1 - x_3)(y_2 - y_3) - (x_2 - x_3)(y_1 - y_3)} \right\}$$

$$V_b = \frac{1}{2}\left\{ \frac{(y_2^2 - y_3^2)(x_1 - x_3) - (y_1^2 - y_3^2)(x_2 - x_3)}{(x_1 - x_3)(y_2 - y_3) - (x_2 - x_3)(y_1 - y_3)} + \right.$$

$$\left. \frac{+(x_1 - x_2)(x_2 - x_3)(x_3 - x_1)}{(x_1 - x_3)(y_2 - y_3) - (x_2 - x_3)(y_1 - y_3)} \right\}$$

Figure 6:
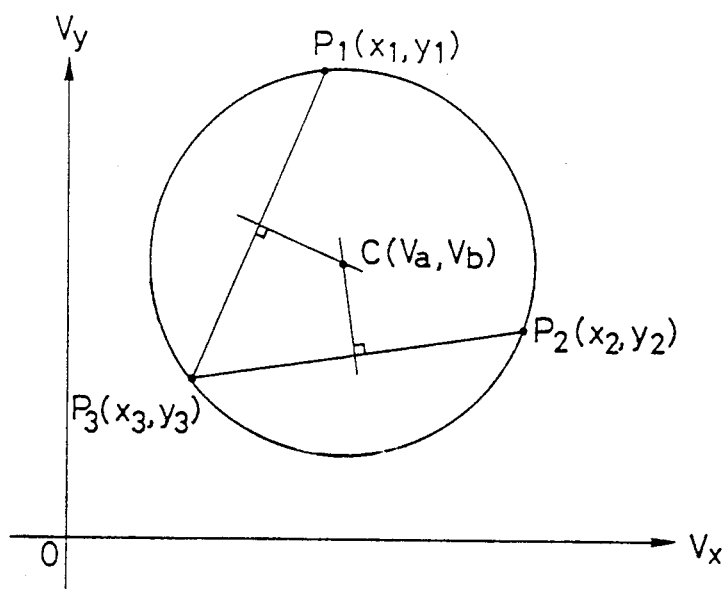

The method of calculating the center C ($V_a$, $V_b$) of the circle of FIG. 5 is not limited to the method of FIG. 6 which uses the three points $P_1$, $P_2$ and $P_3$, but may instead includes a method of using four different points $P_1(x_1, y_2)$, $P_2(x_2, y_2)$, $P_3(x_3, y_3)$ and $P_4(x_4, y_4)$ in accordance with the following equations.

$$V_a = \frac{1}{2} \left\{ \frac{(x_1^2 - x_3^2)(y_2 - y_4) - (x_2^2 - x_4^2)(y_1 - y_3)}{(x_1 - x_3)(y_2 - y_4) - (x_2 - x_4)(y_1 - y_3)} + \right. \quad (7)$$

$$\left. \frac{(y_2 - y_4)(y_1 - y_3)(y_1 + y_3 - y_2 - y_4)}{(x_1 - x_3)(y_2 - y_4) - (x_2 - x_4)(y_1 - y_3)} \right\}$$

$$V_b = \frac{1}{2} \left\{ \frac{(y_2^2 - y_4^2)(x_1 - x_3) - (y_1^2 - y_3^2)(x_2 - x_4)}{(x_1 - x_3)(y_2 - y_4) - (x_2 - x_4)(y_1 - y_3)} + \right.$$

$$\left. \frac{+(x_2 - x_4)(x_1 - x_3)(x_2 + x_4 - x_1 - x_3)}{(x_1 - x_3)(y_2 - y_4) - (x_2 - x_4)(y_1 - y_3)} \right\}$$

By using the above equation (6) or (7), the DC components $V_a$ and $V_b$ (or the coordinates of the center C of the circle) are obtained (Step S2), and the thus obtained DC components are inputted respectively to the subtracters 31 and 32. The subtracters 31 and 32 have input thereto the digital instantaneous values $S_x$ and $S_y$ from the instantaneous value detecting unit 10 to calculate the AC components $V_1$ and $V_2$ (Step S3). The position $\Theta$ is detected by the position detecting unit 30 as stated above (Step S4), and the position signal PS is obtained by addition with the higher-order data TN (Step S5).

In order to minimize errors which may result in carrying out the calculation (6) or (7), when the points $P_1$, $P_2$, $P_3$ and $P_4$ to be used in either equation (6) or (7) are slightly displaced from the circumference of FIG. 7 due to fluctuations in temperature, speed or gap length, the points $P_1$, $P_2$, $P_3$ and $P_4$ are prevented from being concentrated in a given scope on the circumference of FIG. 5. In other words, as shown in FIG. 8, points on the circumference are classified into four groups of $G_1$, $G_2$, $G_3$ and $G_4$ by prescribed values $V_{10}$ and $V_{11}$ on the x and y axes as:

If $X \geq V_{10}, y \geq V_{11} \rightarrow$ Group $G_1$

If $X < V_{10}, y \geq V_{11} \rightarrow$ Group $G_2$

If $X < V_{10}, y < V_{11} \rightarrow$ Group $G_3$

If $X \geq V_{10}, y < V_{11} \rightarrow$ Group $G_4$

By selecting the point $P_1$ from the group $G_1$, the point $P_2$ from the group $G_2$, the point $P_3$ from the group $G_3$ and the point $P_4$ from the group $G_4$, the four points are prevented from being localized in a given scope on the circumference. The classification, however, is not limited to four groups, but may instead include eight groups and the four points may be selected from the eight groups.

This invention has been described for the case where the phase difference of the two-phase AC signals from the position detecting unit is 90°, but the detecting apparatus is applicable to cases other than the above. Although a position detecting apparatus for rotary movement has been described in the foregoing statement, this invention ia also applicable to a position detecting sensor for linear movement. The position detecting apparatus is not limited to a magnetic sensor, and may instead be applied to any sensor containing two-phase AC components.

Since the position detecting apparatus according to this invention can obtain DC components directly from the signals output from a position detecting unit, even if the DC components fluctuate due to various factors, it is possible to obtain the values of the DC components after such fluctuations. This constantly enables detection of AC components alone which correspond to the position of an object based on the output signals from the position detecting sensor, assuring high precision positional detection.

It should be understood that many modifications and adaptations of the invention will become apparent to those skilled in the art and the invention is intended to encompass such obvious modifications and changes in the scope of the claims appended hereto.

What is claimed is:

1. A position detecting apparatus for detecting a position of an object, comprising:

sensor means for detecting a position of the object and for outputting first and second AC detection signals which have a predetermined phase relationship and which correspond to the detected position of the object;

instantaneous value detecting means for detecting and outputting instantaneous values of the first and second AC detection signals;

DC component detecting means for processing the instantaneous values output by said instantaneous value detecting means to obtain first and second DC components of the first and second AC detection signals, respectively;

position calculating means for calculating the position of the object based on the first AC detection signal having the first DC component subtracted therefrom and the second AC detection signal having the second DC component subtracted therefrom.

2. A position detecting apparatus as claimed in claim 1, wherein the first and second AC detection signals output from said sensor unit are sine-wave AC signals respectively having AC components $V_1 = V\cos\Theta$, $V_2 = V\cos(\Theta - \alpha)$, wherein $\alpha$ is a phase difference between the first and second AC detection signals.

3. A position detecting apparatus as claimed in claim 2, wherein said position calculating means includes means for calculating $\Theta = \tan^{-1}(\cos\alpha/\sin\alpha - 1/\sin\alpha \cdot V_2/V_1)$, wherein $\Theta$ denotes an angular position of the object.

4. A position detecting apparatus as claimed in claim 1, wherein said DC component detecting means includes means for calculating the first and second DC components based on at least three instantaneous values of each of the first and second AC detection signals, wherein the at least three instantaneous values of each of the first and second AC detection signals define a center of a circle plotted on a plane having axes corresponding to the first and second AC detection signals.

5. A position detecting apparatus as claimed in claim 4, wherein said DC component detecting means includes means for classifying the at least three instantaneous values into at least three groups, wherein calculation of the first and second DC components is based on prescribed combinations of the instantaneous values in accordance with the at least three groups.

6. A position detecting apparatus as claimed in claim 1, wherein three different instantaneous values of each of the first and second AC detection signals are given as $(x_1, y_1)$, $(x_2, y_2)$ and $(X_3, y_3)$, respectively, and said DC component detecting means includes means for calculating the following equations, $$V_a = \frac{1}{2} \left\{ \frac{(x_1^2 - x_3^2)(y_2 - y_3) - (x_2^2 - x_3^2)(y_1 - y_3)}{(x_1 - x_3)(y_2 - y_3) - (x_2 - x_3)(y_1 - y_3)} + \frac{-(y_1 - y_2)(y_2 - y_3)(y_3 - y_1)}{(x_1 - x_3)(y_2 - y_3) - (x_2 - x_3)(y_1 - y_3)} \right\}$$

$$V_b = \frac{1}{2} \left\{ \frac{(y_2^2 - y_3^2)(x_1 - x_3) - (y_1^2 - y_3^2)(x_2 - x_3)}{(x_1 - x_3)(y_2 - y_3) - (x_2 - x_3)(y_1 - y_3)} + \frac{+(x_1 - x_2)(x_2 - x_3)(x_3 - x_1)}{(x_1 - x_3)(y_2 - y_3) - (x_2 - x_3)(y_1 - y_3)} \right\}$$

wherein Va and Vb respectively denote the first and second DC components.

7. A position detecting apparatus as claimed in claim 1, wherein four different instantaneous values of each of the first and second AC detection signals are given as $(x_1, y_1)$, $(x_2, y_2)$, $(x_3, y_3)$ and $(x_4, y_4)$, respectively, and wherein said DC component detecting means includes means for calculating the following equations, $$V_a = \frac{1}{2} \left\{ \frac{(x_1^2 - x_3^2)(y_2 - y_4) - (x_2^2 - x_4^2)(y_1 - y_3)}{(x_1 - x_3)(y_2 - y_4) - (x_2 - x_4)(y_1 - y_3)} + \frac{(y_2 - y_4)(y_1 - y_3)(y_1 + y_3 - y_2 - y_4)}{(x_1 - x_3)(y_2 - y_4) - (x_2 - x_4)(y_1 - y_3)} \right\}$$

$$V_b = \frac{1}{2} \left\{ \frac{(y_2^2 - y_4^2)(x_1 - x_3) - (y_1^2 - y_3^2)(x_2 - x_4)}{(x_1 - x_3)(y_2 - y_4) - (x_2 - x_4)(y_1 - y_3)} + \frac{+(x_2 - x_4)(x_1 - x_3)(x_2 + x_4 - x_1 - x_3)}{(x_1 - x_3)(y_2 - y_4) - (x_2 - x_4)(y_1 - y_3)} \right\}$$

wherein Va and Vb respectively denote the first and second DC components.

8. A position detecting apparatus as claimed in claim 3, wherein said DC component detecting means includes means for calculating the first and second DC components based on at least three instantaneous values of each of the first and second AC detection signals, wherein the at least three instantaneous values of each of the first and second AC detection signals define a center of a circle plotted on a plane having axes corresponding to the first and second AC detection signals.

9. A position detecting apparatus as claimed in claim 8, wherein said DC component detecting means includes means for classifying at least three instantaneous values into a least three groups, wherein calculation of the first and second DC components is based on prescribed combinations of the instantaneous values in accordance with the at least three groups.

* * * * *